United States Patent [19]
Ekeroth et al.

[11] Patent Number: 5,263,067
[45] Date of Patent: Nov. 16, 1993

[54] LOCATING HOT AND COLD-LEGS IN A NUCLEAR POWERED STEAM GENERATION SYSTEM

[75] Inventors: Douglas E. Ekeroth, Delmont; Michael M. Corletti, New Kensington, both of Pa.

[73] Assignee: Westinghouse Electric Corp., Pittsburgh, Pa.

[21] Appl. No.: 903,636

[22] Filed: Jun. 24, 1992

[51] Int. Cl.[5] ............................. G21C 15/18
[52] U.S. Cl. ..................... 376/298; 376/260
[58] Field of Search ............... 376/260, 277, 298

[56] References Cited

U.S. PATENT DOCUMENTS

| | | | |
|---|---|---|---|
| 4,769,209 | 9/1988 | Tower et al. | 376/402 |
| 4,957,693 | 9/1990 | Lau | 376/298 |
| 5,061,432 | 10/1991 | Matusz | 376/260 |

OTHER PUBLICATIONS

Nuclear Engineering International, Vijuk et al., Nov. 1988, "AP600 offers a simpler way to greater safety, operability and maintainability", pp. 22–28.

*Primary Examiner*—Daniel D. Wasil
*Attorney, Agent, or Firm*—J. C. Valentine

[57] ABSTRACT

A nuclear reactor steam generator includes a reactor vessel for heating water and a steam generator with a pump casing at the lowest point on the steam generator. A cold-leg pipe extends horizontally between the steam generator and the reactor vessel to return water from the steam generator to the reactor vessel. The bottom of the cold-leg pipe is at a first height above the bottom of the reactor vessel. A hot-leg pipe with one end connected to the steam generator and a second end connected to the reactor vessel has a first pipe region extending downwardly from the steam generator to a location between the steam generator and the reactor vessel at which a bottom of the hot-leg pipe is at a second height above the bottom of the reactor vessel. A second region extends from that location in a horizontal direction at the second height to the point at which the hot-leg pipe connects to the reactor vessel. A pump is attached to the casing at a location below the first and second heights and returns water from the steam generator to the reactor vessel over the cold-leg. The first height is greater than the second height and the bottom of the steam generator is at a height above the bottom of the reactor vessel that is greater than the first and second heights. A residual heat recovery pump is below the hot-leg and has an inlet line from the hot-leg that slopes down continuously to the pump inlet.

4 Claims, 2 Drawing Sheets

LOCATING HOT AND COLD-LEGS IN A NUCLEAR POWERED STEAM GENERATION SYSTEM

GOVERNMENT CONTRACT

The Government of the United States of America has rights in this invention pursuant to Contract No. DE-AC03-90SF18495 awarded by the Department of Energy.

TECHNICAL FIELD

This invention relates to the nuclear reactors, in particular, locating outlet and inlet piping in pressurized nuclear powered steam generation system.

BACKGROUND OF THE INVENTION

In a pressurized nuclear powered steam generation system, water is passed over the reactor core in a pressurized vessel, where water is heated. From the core, the heated water is supplied to a steam generation vessel through piping referred to as the "hot-leg". In the steam generation vessel, the hot-leg water heats water that is converted to steam. The steam is employed to drive a steam turbine, producing electricity. The hot-leg water, cooled in the process, is returned to the reactor vessel in piping referred to as "cold-leg". Large pumps, mounted in the cold-leg piping, return the water from the steam generator to the reactor.

Servicing the pumps can present unusual problems. The pumps are very large and heavy, and water must be drained from the cold-leg to permit pump removal. The radioactive core must be furnished with cooling water during this period, otherwise it must be removed to an area where is can be cooled, a time consuming process during which the plant does not produce any electricity, increasing operating costs, especially when unplanned pump maintenance is needed. U.S. Pat. No. 4,957,693 shows apparatus that recirculates cooling water for residual heat removal (RHR) with a nuclear reactor system.

DISCLOSURE OF THE INVENTION

An object of the invention is to mount the pumps such that maintenance can be accomplished without removing the core and provide adequate reactor core cooling without requiring isolation valves around the pumps.

Other objects of the present invention include providing a hot-leg and cold-leg configuration that simplifies the process of servicing the pumps.

According to the present invention, the hot and cold-legs are connected to the reactor vessel at individual locations such that the bottom of the hot-leg defines a minimum water level in the vessel, a level below which the water level cannot fall when the pumps are removed and residual cooling flow is running.

According to the invention, the bottom of the cold-leg defines the highest possible water level in the vessel, a level at which water cannot leak out through the service pump openings.

According to the invention, the hot-leg has an arcuate shape, exiting the vessel in a horizontal orientation and bending upward to connect with the bottom of the steam generator at a location above both legs. The bottom of the cold-leg is on a horizontal plane that is between the mid-point and top of the horizontal portion of the hot-leg. Residual heat cooling lines are connected to the bottom of the hot-leg and return to the vessel at a location approximately at the bottom of the hot-leg. This provides the cooling flow during pump removal. Water level is maintained in the hot-leg at approximately "mid-pipe" during this cooling flow operation allowing the pump to be removed.

According to the invention, the flow rates for these cooling lines are selected to provide sufficient volume to prevent surging that could cause water to flood the pump casing during pump servicing.

According to the present invention, these cooling lines slope down continuously to the residual heat cooling pump inlet to facilitate line refill and prevent air from entering the inlet of the pump that recirculates water to remove residual core heat.

Among the features and benefits of the invention is that it makes it possible to easily locate the pumps directly below the steam generators and that it greatly facilitates servicing the pumps and steam generator. Another feature is that it provides optimal residual heat cooling. Other objects, benefits and features of the invention will be apparent to one skilled in the art from the following discussion.

BEST MODE FOR CARRYING OUT THE INVENTION

Figure 1:
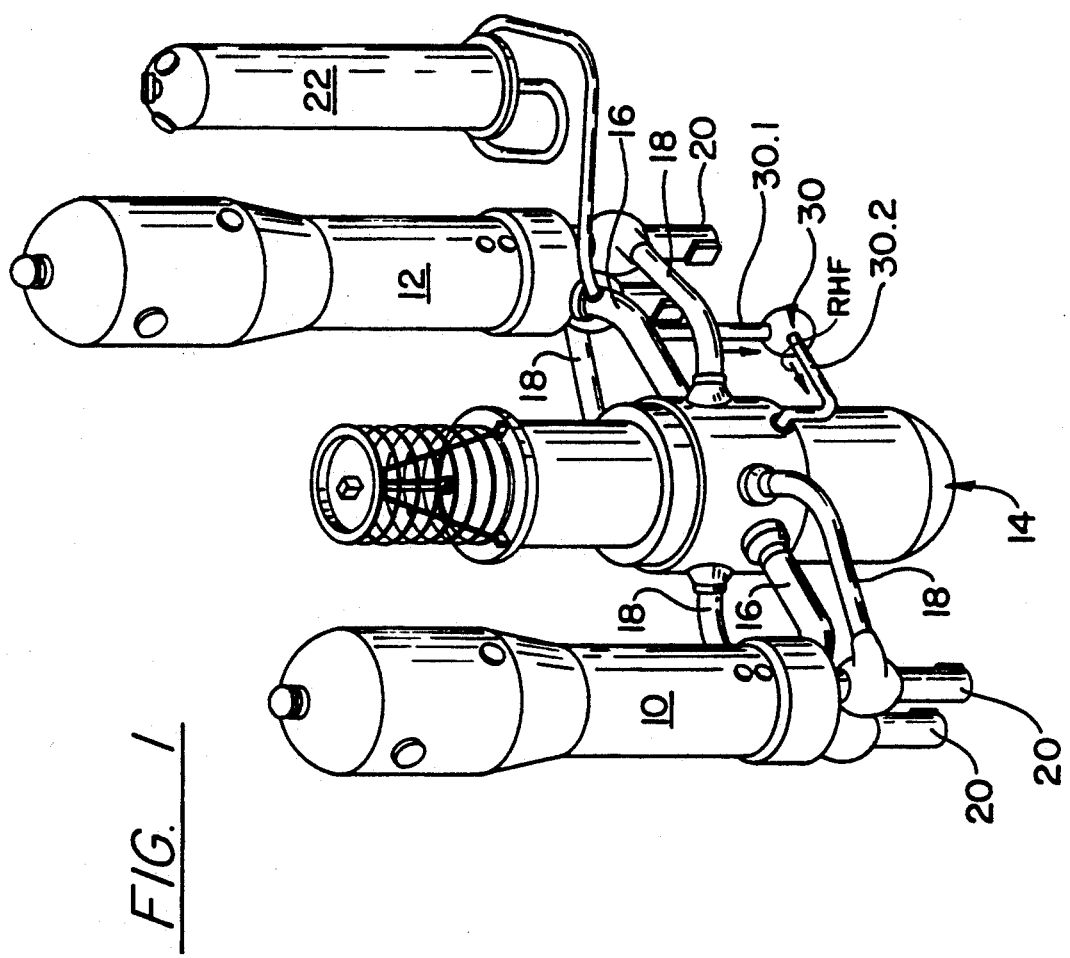
FIG. 1 is a perspective view of a much simplified nuclear powered steam generation system that embodies the present invention.

The system shown in FIG. 1 has two steam generators 10, 12. A reactor vessel 14 is connected to each of these generators over one hot-leg 16 and two cold-legs 18. Water is pumped into the reactor by pumps 20 (located below the bottom of each steam generator) over the cold-legs, heated in the reactor and returned to the steam generator over the hot-leg. Element 22 is a pressurizer to replenish water in the system.

Figure 2:
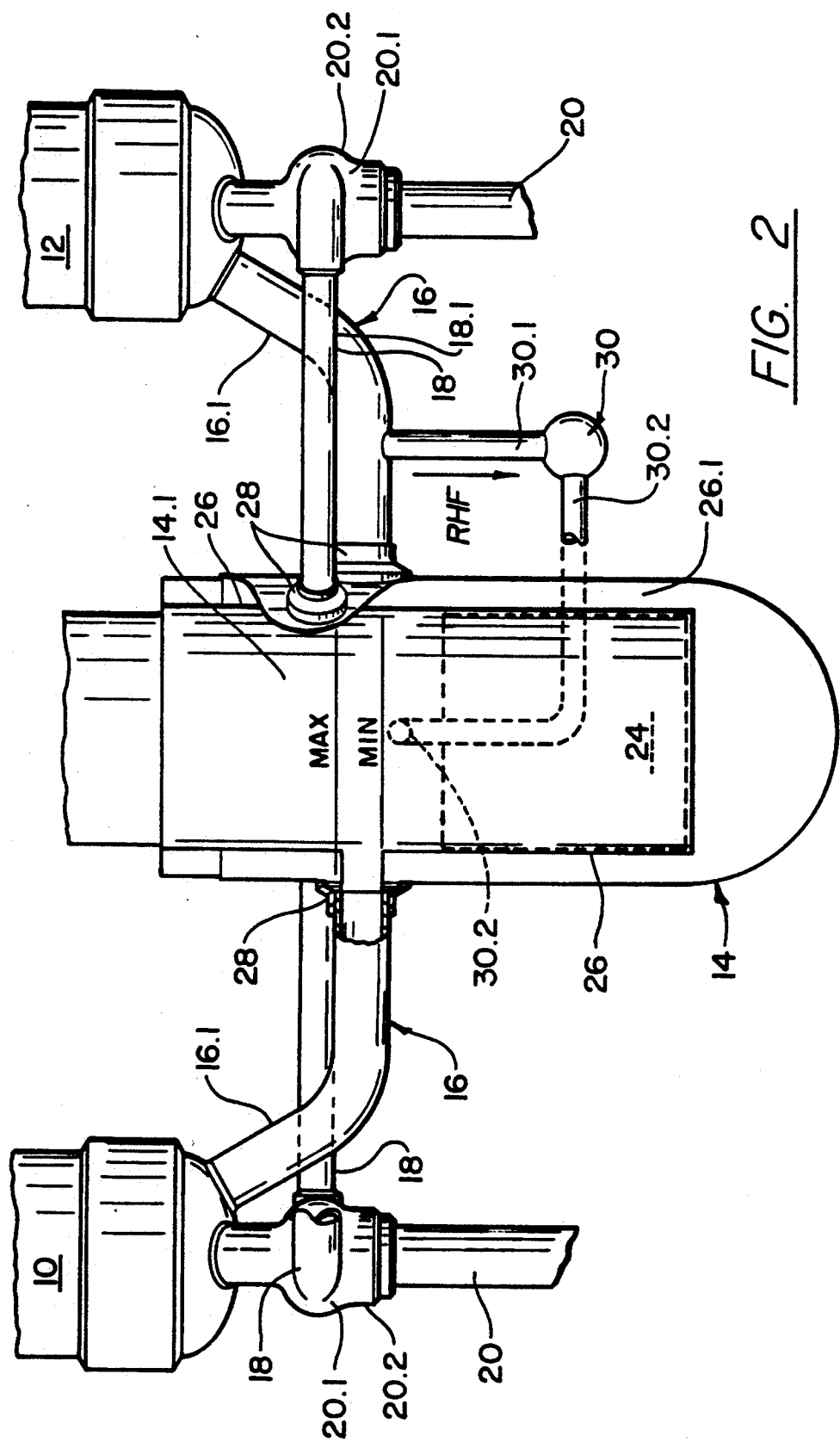
FIG. 2, an elevation showing the system shown in FIG. 1 from direction "1", includes a cross-section of the reactor vessel taken along line 2—2 in FIG. 1.

FIG. 2 also shows the two steam generators 10, 12 and includes a simplified sectional of the reactor, revealing the core 24 within a barrel 26. Both the hot-leg 16 and cold-leg 18 are connected to the reactor at flanges 28A, 28B and water enters from the cold-leg 18 goes down around the outside of the barrel 26.1 and up through the core to an chamber 14.1, connected to the hot-leg 16. The return of the cold-leg 18 follows a horizontal or general "level" direction to the reactor 14, discharging from the side 20.1 of the pump casing 20.2, where the pump 20 is at the low point of the casing. The bottom inside wall 18.1 of the cold-leg pipe defines a maximum water level (MAX) in the reactor 14 during pump servicing. If a pump 20 is removed, the water cannot rise above this level, to prevent water loss during servicing. The bottom of the hot-leg, on the other hand, is located below the cold-leg but at a suitable distance above the core to ensure cooling water level to prevent core overheating during servicing. However, because of the upward bend 16.1 (arcuate shape) in the hot-leg 16, water will not leave the reactor from the hot-leg 16 when a pump 20 is removed for service. A benefit to this approach is that the hot and cold-leg pipes are not significantly separated at the vessel. If they were, the costs of the vessel would increase.

A residual heat removal pump 30 is connected to the hot-leg pipe 16 by heat exchanger line 30.1 and the vessel at position at or below the MIN level (the bottom of hot-leg pipe 16) by the line 30.2. When the water level is reduced to service the pumps 20, this pump 30 operates to circulate water to remove residual heat from the core. To prevent "surging" of the water as it leaves the line 30.2, which could cause water to enter the cold-leg 18, the volume of the exchanger 30.1 is enlarged so that a low flow rate can be used yet provide proper "residual cooling". Also, as shown, the line 30.1, the pump and the line 30.2 are significantly below the hot-leg pipe 16, following a continuous slope down from the hot-leg 16 without any high points. This facilitates line self-refilling, preventing air from entering the pump inlet, which ensures an adequate supply of water to the pump inlet from the hot-leg 16 at all times during servicing.

With the benefit of the foregoing discussion, one skilled in the art may be able to make modifications to the invention, in whole or in part, without departing from the true scope and spirit of the invention described in the claims that follow.

We claim:

1. A nuclear reactor steam generator characterized by:
   a reactor vessel for heating water;
   a steam generator with a pump casing at the lowest point on the steam generator;
   a cold-leg pipe extending horizontally between the steam generator and the reactor vessel to return water from the steam generator to the reactor vessel, the bottom of the cold-leg pipe being at a first height above a reactor core in the reactor vessel; a hot-leg pipe with one end connected to the steam generator and a second end connected to the reactor vessel; the hot-leg pipe having a first pipe region extending downwardly from the steam generator to a pipe location between the steam generator and the reactor vessel at which the bottom of the hot-leg pipe is at a second height above the bottom of the reactor core and having a second pipe region extending from said location in a horizontal direction at said second height to connect with the reactor vessel; a pump attached to the casing at a location below the first and second heights for pumping water between the steam generator and the reactor vessel over the cold-leg pipe;
   the first height being between the mid-point in the hot-leg pipe and the top of the hot-leg pipe;
   the bottom of the steam generator being at a height that is greater than the first and second heights, and
   a residual heat recovery system for producing a water flow between the hot-leg and the reactor vessel to cool the reactor core without injecting water into the cold-leg, the heat recovery system having at outlet at a location on the reactor vessel below the bottom of the hot-leg and above the reactor core.

2. A method for connecting a steam generator and a nuclear reactor vessel containing a reactor core, characterized by the steps:
   extending a cold-leg pipe horizontally from a first port on a side wall of the reactor vessel to the steam generator, the bottom wall of the cold-leg pipe being at a first height above the reactor core;
   connecting the cold-leg pipe to a pump casing at the bottom of the stream generator;
   extending a hot-leg pipe downwardly at an angle to the horizontal from a connection point on the steam generator to a bend location at which the bottom of the hot-leg pipe is at a second height above the core, and extending the hot-leg pipe horizontally from the bend location to a second port on the side wall;
   mounting a pump at the bottom of the steam generator and connecting a pump outlet to the cold-leg pipe; and
   connecting an inlet of a residual heat recovery system to the hot-leg pipe at a location between the bend location and the vessel and connecting an outlet of the residual heat recovery system to a port on the vessel at a location below the second height and above the reactor core, the residual heat recovery system producing a water flow rate between the hot-leg and the reactor core vessel to cool the reactor without injecting water into the cold-leg.

3. A method for modifying a nuclear reactor steam generator comprising:
   a cold-leg pipe for returning water from a steam generator to a reactor vessel containing a reactor core;
   a hot leg pipe for supplying water to the steam generator; and
   a pump for supplying the water from the steam generator to the cold-leg pipe;
   a residual heat exchanger comprising a pump and a heat exchanger operable in combination to recirculate water between the hot-leg pipe and the reactor vessel at a first flow rate; and
   characterized by the steps:
   raising a bottom of the steam generator above the hot-leg pipe and cold-leg pipe;
   raising a cold-leg pipe inlet to the reactor vessel to a height at which a bottom of the cold-leg pipe is above the mid-point of the hot-leg pipe and below the top of the hot-leg pipe; extending the cold-leg pipe horizontally from the reactor vessel to a pump casing on the bottom of the steam generator;
   extending the hot-leg pipe horizontally from the reactor vessel for a first distance and then arcuately upward to an inlet on the bottom of the steam generator;
   enlarging the volume of the heat exchanger to reduce the recirculation rate below a rate at which agitation in the reactor vessel from water recirculation injects water into the cold-leg pipe when water level in the reactor vessel is at a service level that is between the midpoint of the hot-leg pipe and the bottom of the cold-leg pipe and at a selected height above a reactor core in the reactor vessel; and
   connecting an outlet from the heat exchanger to the reactor vessel at a location below the bottom of the hot-leg and above the reactor core.

4. A method according to claim 3, further characterized by the steps: locating the pump in the residual heat exchanger and inlet lines from the pump inlet to the hot-leg pipe below the hot-leg pipe with the pump at the lowest point.

* * * * *